US012632027B2

(12) United States Patent　(10) Patent No.:　US 12,632,027 B2
Idehara et al.　(45) Date of Patent:　May 19, 2026

(54) SETTING ASSISTANCE DEVICE, CONTROL SYSTEM, SETTING ASSISTANCE METHOD, AND MEDIUM

(71) Applicant: Mitsubishi Electric Corporation, Tokyo (JP)

(72) Inventors: Akio Idehara, Tokyo (JP); Kei Terada, Tokyo (JP); Kengo Ibe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/879,831

(22) PCT Filed: Sep. 21, 2022

(86) PCT No.: PCT/JP2022/035109
§ 371 (c)(1),
(2) Date: Dec. 30, 2024

(87) PCT Pub. No.: WO2024/062548
PCT Pub. Date: Mar. 28, 2024

(65) Prior Publication Data
US 2025/0258474 A1　Aug. 14, 2025

(51) Int. Cl.
*G05B 19/05*　(2006.01)

(52) U.S. Cl.
CPC .........　*G05B 19/056* (2013.01); *G05B 19/054* (2013.01); *G05B 2219/13004* (2013.01)

(58) Field of Classification Search
None
See application file for complete search history.

(56) References Cited

U.S. PATENT DOCUMENTS

| | | | |
|---|---|---|---|
| 2018/0143606 A1 | 5/2018 | Kawanoue et al. | |
| 2019/0095246 A1 | 3/2019 | Nakano et al. | |
| 2021/0216047 A1 | 7/2021 | Sugiyama et al. | |
| 2021/0303495 A1* | 9/2021 | Ichiyanagi | G06F 13/362 |
| 2022/0210247 A1 | 6/2022 | Maekawa et al. | |

FOREIGN PATENT DOCUMENTS

| | | |
|---|---|---|
| JP | 2009-157752 A | 7/2009 |
| JP | 4807475 B1 | 11/2011 |
| JP | 2017-079009 A | 4/2017 |

(Continued)

OTHER PUBLICATIONS

International Search Report and Written Opinion mailed on Nov. 29, 2022, received for PCT Application PCT/JP2022/035109, filed on Sep. 21, 2022, 8 pages including English Translation.

(Continued)

*Primary Examiner* — Ryan A Jarrett
(74) *Attorney, Agent, or Firm* — XSENSUS LLP

(57)　ABSTRACT

A setting assistance device assists in setting a controller to communicate with a control target device in constant cycles. The setting assistance device includes a receiver that receives, from a user, an indication of a feature of the controller, a cycle determiner that determines a communication cycle of the controller based on the indication received by the receiver, and a setter a that sets, for the controller, the communication cycle determined by the cycle determiner.

5 Claims, 16 Drawing Sheets

(56)         References Cited

FOREIGN PATENT DOCUMENTS

| | | | |
|---|---|---|---|
| JP | 2018-084894 | A | 5/2018 |
| JP | 2019-061467 | A | 4/2019 |
| JP | 2020-149439 | A | 9/2020 |
| JP | 2022-133624 | A | 9/2022 |
| WO | 2020/067286 | A1 | 4/2020 |
| WO | 2020/184035 | A1 | 9/2020 |

OTHER PUBLICATIONS

Notification of Reason for Refusal mailed on Mar. 28, 2023, received for JP Application 2023-511686, 6 pages including English Translation.
Notification of Reason for Refusal mailed on Jun. 13, 2023, received for JP Application 2023-511686, 7 pages including English Translation.
Decision to Grant mailed on Nov. 7, 2023, received for JP Application 2023-511686, 5 pages including English Translation.

\* cited by examiner

| Select specific features | |
|---|---|

| Feature | Selection |
|---|---|
| Control process 1 | |
| Method A | ☑ |
| Method B | ☐ |
| Control process 2 | |
| Control C | ☑ |
| Control D | ☐ |
| Control E | ☐ |
| Control process 3 | |
| Enabled? | ☑ |

⋮

| Select |
|---|

*FIG. 4*

| Feature | Execution time (μs) | Proportional to number of connected devices? | Measurement target? |
|---|---|---|---|
| Control process 1 | | | |
| Method A | 50 | Yes | Yes |
| Method B | 20 | Yes | Yes |
| Control process 2 | | | |
| Control C | 20 | Yes | No |
| Control D | 40 | Yes | No |
| Control E | 15 | Yes | No |
| Control process 3 | | | |
| Enabled | 100 | No | Yes |
| Disabled | 0 | No | No |

| Select a program to be analyzed | | |
|---|---|---|

| File name | File format | Selection |
|---|---|---|
| program1.c | C language | ⦿ |
| program2.wpg | Ladder diagram | ◎ |
| program3.out | Binary | ◎ |
| program3.fbd | Function block diagram | ◎ |

Select

*FIG. 9*

| Function name | Feature |
|---|---|
| funcA | Control process 1 - Method A |
| funcB | Control process 2 - Control D |
| funcC | Control process 3 - Enabled, Control process 4 - Setting 1 |

Input specific communication cycle
and select specific feature(s)

| Specific communication cycle (μs) | 500 |
| --- | --- |

| Feature | Selection |
| --- | --- |
| Control process 1 | |
| Method A | ☑ |
| Method B | ☐ |
| Control process 2 | |
| Control C | ☑ |
| Control D | ☐ |
| Control E | ☐ |
| Control process 3 | |
| Enabled? | ☑ |

⋮

Select

FIG. 12

| Input specific communication cycle and select specific feature(s) | |
| --- | --- |

| Specific communication cycle (µs) | 500 |
| --- | --- |

| Feature | Selection |
| --- | --- |
| Control process 1 | |
| Method A | ☑ |
| Method B | ☐ |
| Control process 2 | |
| Control C | ☑ |
| Control D | ☐ |
| Control E | ☑ (Automatic selection) |
| Control process 3 | |
| Enabled? | ☑ |

⋮

Select

*FIG. 14*

| Feature | Execution time (µs) | Proportional to number of connected devices? | Measurement target? | Priority |
|---|---|---|---|---|
| Control process 1 | | | | |
| Method A | 50 | Yes | Yes | 10 |
| Method B | 20 | Yes | Yes | 20 |
| Control process 2 | | | | |
| Control C | 20 | Yes | No | 30 |
| Control D | 40 | Yes | No | 40 |
| Control E | 15 | Yes | No | 50 |
| Control process 3 | | | | |
| Enabled | 100 | No | Yes | 80 |
| Disabled | 0 | No | No | 10 |

· · · · ·

SETTING ASSISTANCE DEVICE, CONTROL SYSTEM, SETTING ASSISTANCE METHOD, AND MEDIUM

CROSS-REFERENCE TO RELATED APPLICATION

This application is a national stage application, pursuant to 35 U.S.C. § 371, of International Patent Application No. PCT/JP2022/035109, filed Sep. 21, 2022, the entire contents of which are incorporated herein by reference.

TECHNICAL FIELD

The present disclosure relates to a setting assistance device, a control system, a setting assistance method, and a program.

BACKGROUND ART

Controllers such as motion controllers and programmable logic controllers typically communicate with control target devices in constant cycles.

Although such controllers are to be in shorter communication cycles, the controllers cannot communicate normally in too short communication cycles, with limitations on, for example, the communication protocols and the specifications of the control target devices. Techniques are thus awaited for setting appropriate communication cycles.

Patent Literature 1 describes a controller that inquires about a communication cycle settable to each control target device and determines the communication cycle based on parameters such as the communication cycle setting and the communication overhead of each control target device.

CITATION LIST

Patent Literature

Patent Literature 1: Unexamined Japanese Patent Application Publication No. 2020-149439

SUMMARY OF INVENTION

Technical Problem

However, with the determination not based on internal processing of the controller, the controller described in Patent Literature 1 may not set an appropriate communication cycle.

Under such circumstances, an objective of the present disclosure is to provide a setting assistance device, a control system, a setting assistance method, and a program that can determine a communication cycle of a controller as appropriate for internal processing of the controller.

Solution to Problem

To achieve the above objective, a setting assistance device according to an aspect of the present disclosure is a setting assistance device for assisting in setting a controller to communicate with a control target device in constant cycles. The setting assistance device includes feature receiving means for receiving, from a user, an indication of a feature of the controller, cycle determination means for determining a communication cycle of the controller based on the indication received by the feature receiving means, and setting means for setting, for the controller, the communication cycle determined by the cycle determination means.

Advantageous Effects of Invention

The setting assistance device according to the above aspect of the present disclosure can determine a communication cycle of a controller as appropriate for internal processing of the controller.

BRIEF DESCRIPTION OF DRAWINGS

FIG. 1 is a block diagram of a control system according to Embodiment 1 of the present disclosure, illustrating the overall configuration;

FIG. 2 is a diagram of an example screen for feature selection presented by a setting assistance device according to Embodiment 1 of the present disclosure;

FIG. 4 is a diagram of an example execution time table stored in a storage in the setting assistance device according to Embodiment 1 of the present disclosure;

FIG. 5 is a diagram of the setting assistance device according to Embodiment 1 of the present disclosure, illustrating an example hardware configuration;

FIG. 7 is a diagram of an example screen for program selection presented by a setting assistance device according to Embodiment 2 of the present disclosure;

FIG. 9 is a diagram of an example function correspondence table stored in a storage in the setting assistance device according to Embodiment 2 of the present disclosure;

FIG. 11 is a diagram of an example screen for feature selection presented by a setting assistance device according to Embodiment 3 of the present disclosure;

FIG. 12 is a diagram of an example screen for feature selection presented by the setting assistance device according to Embodiment 3 of the present disclosure, with a feature selected automatically;

FIG. 14 is a diagram of an example execution table stored in a storage in the setting assistance device according to Embodiment 3 of the present disclosure;

DESCRIPTION OF EMBODIMENTS

Figure 3:
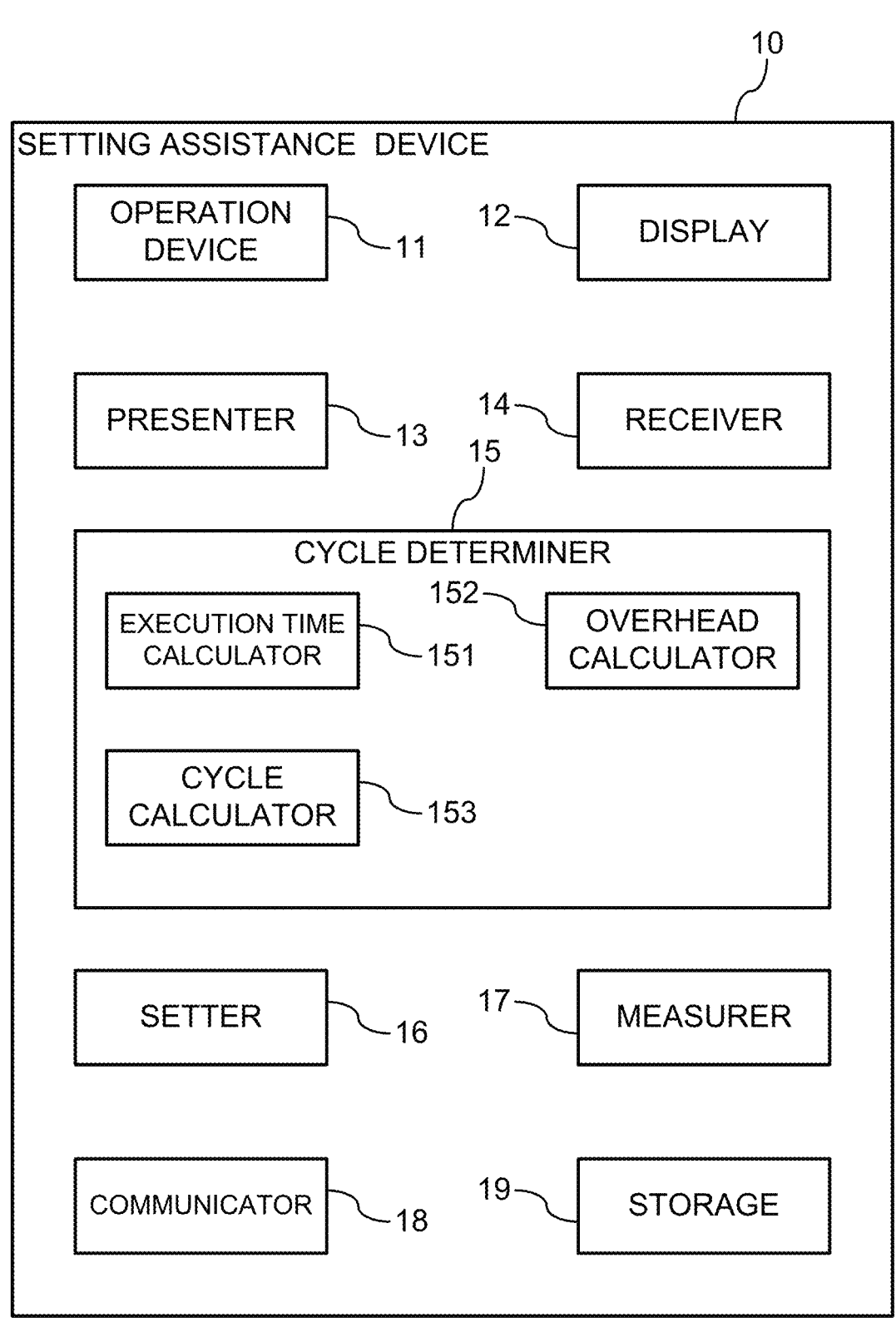
FIG. 3 is a functional block diagram of the setting assistance device according to Embodiment 1 of the present disclosure.

A control system according to one or more embodiments of the present disclosure is described below with reference to the drawings. Like reference signs denote like or corresponding components in the drawings.

Embodiment 1

Figure 1:
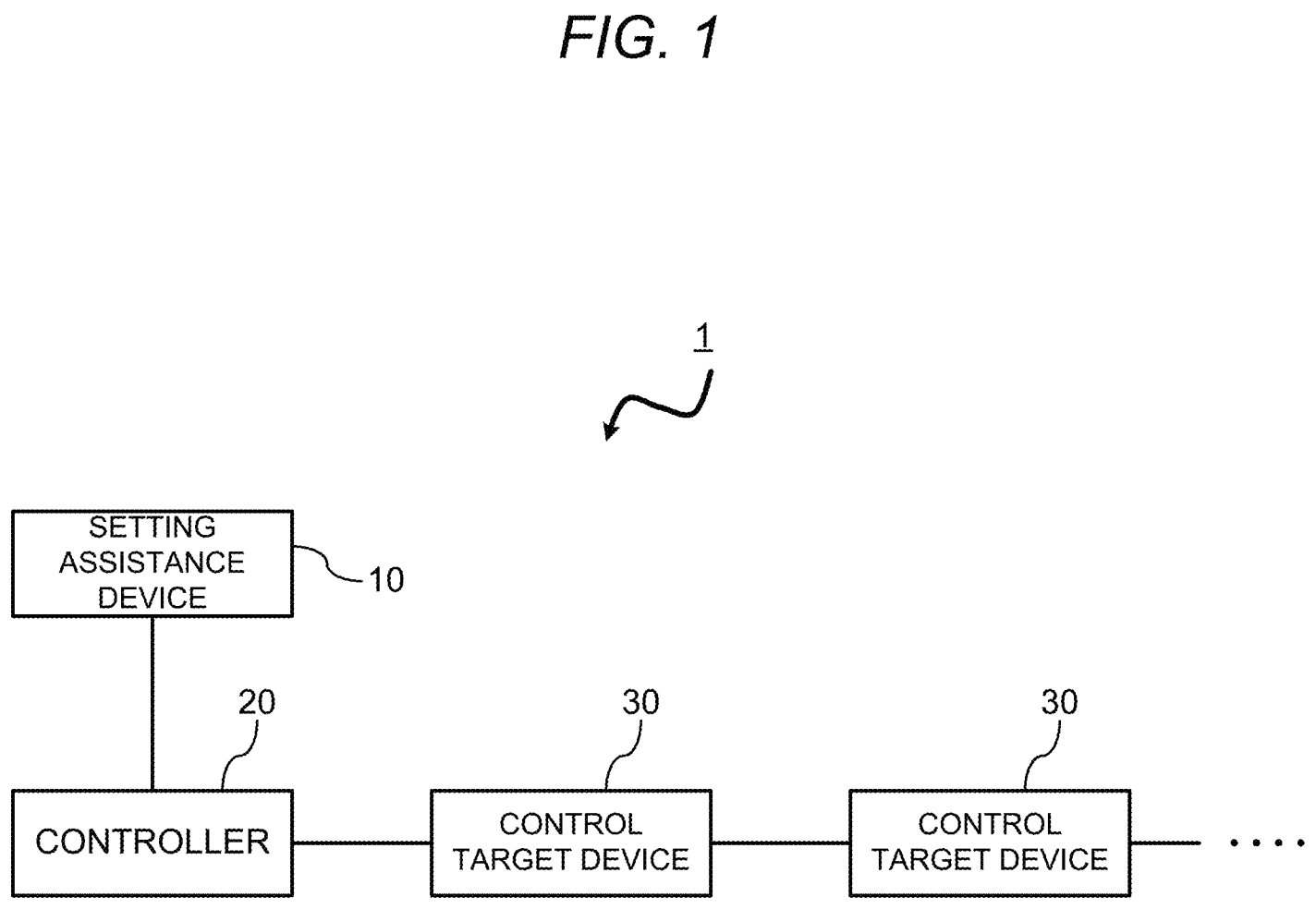

A control system 1 according to Embodiment 1 is described with reference to FIG. 1. The control system 1 includes a setting assistance device 10, a controller 20, and one or more control target devices 30. The control system 1 is an example of a control system according to an aspect of the present disclosure.

The setting assistance device 10 is connected to the controller 20 for mutual communication. The controller 20 is connected to the control target devices 30 for mutual communication. In FIG. 1, each control target device 30 is connected to the controller 20 in a daisy chain. Instead, two or more control target devices 30 may be directly connected to the controller 20 for mutual communication.

In the control system 1, the setting assistance device 10 sets the controller 20, and the controller 20 controls the control target devices 30. The controller 20 communicates with the control target devices 30 in constant cycles to control the control target devices 30.

The setting assistance device 10 is used for setting the controller 20 for controlling each control target device 30. The setting assistance device 10 is, for example, a computer such as a personal computer (PC), a factory automation (FA) PC, a smartphone, or a tablet terminal. The computer functions as the setting assistance device 10 when an engineering tool program is installed on the computer. The setting assistance device 10 is an example of a setting assistance device according to an aspect of the present disclosure.

The setting assistance device 10 transmits, to the controller 20, various parameter values or a control program to be executed by the controller 20. In particular, the setting assistance device 10 transmits data indicating a communication cycle to the controller 20 to set the communication cycle for the controller 20. The setting of the communication cycle is described later. The functional components of the setting assistance device 10 are also described later.

The controller 20 communicates with the control target devices 30 in constant cycles to control the control target devices 30. The controller 20 operates as a master for the control target devices 30. The controller 20 is, for example, a motion controller or a programmable logic controller. The controller 20 communicates with the setting assistance device 10, and, for example, sets the received parameters or updates the received control program. In particular, the controller 20 sets the communication cycle of the controller 20 based on the data indicating the communication cycle received from the setting assistance device 10. The controller 20 is an example of a controller in an aspect of the present disclosure.

The control target devices 30 communicate with the controller 20 in constant cycles and are thus controlled by the controller 20. The control target devices 30 operate as slaves to the controller 20 that serves as the master. The control target devices 30 are, for example, servo amplifiers for driving an actuator (not illustrated). The control target devices 30 are each an example of a control target device in an aspect of the present disclosure.

The setting of the communication cycle for the controller 20 performed by the setting assistance device 10 is schematically described with reference to FIG. 2. FIG. 2 illustrates a user interface screen presented by the setting assistance device 10 to a user. The screen illustrated in FIG. 2 presents a list of features for the controller 20 that affect the communication cycle to allow the user to select specific features necessary for the controller 20. The column of Feature includes the itemized internal processing of the controller 20, including a control process 1, a control process 2, and a control process 3. Each of the features for the controller 20 is implemented by internal processing of the controller 20. Each item in the Feature column includes subitems such as methods, specific control information, and whether the item is enabled. When the user selects the specific features by selecting checkboxes in the Feature column and selects a select button, the setting assistance device 10 determines the communication cycle based on the selected features and sets the determined communication cycle for the controller 20.

The functional components of the setting assistance device 10 are described with reference to FIG. 3. The setting assistance device 10 includes an operation device 11, a display 12, a presenter 13, a receiver 14, a cycle determiner 15, a setter 16, a measurer 17, a communicator 18, and a storage 19.

The operation device 11 receives an operation performed by the user. The operation device 11 is an input device such as a mouse, a keyboard, or a touchscreen.

The display 12 displays various screens, including the screen illustrated in FIG. 2. The display 12 is a display device such as a liquid crystal display or an organic electroluminescent (EL) display. For the operation device 11 as a touchscreen, the display 12 may be integral with the operation device 11.

The communicator 18 communicates with the controller 20. The communicator 18 is, for example, implemented by a network interface.

The storage 19 stores data indicating a list of features that can be performed by the controller 20, and an execution time table described later. The data and the execution time table are created in advance by, for example, a manufacturer of the engineering tool for the setting assistance device 10.

The presenter 13 generates and displays the screen illustrated in FIG. 2 on the display 12 to present, for the user to select from, the list of features for the controller 20 that affect the communication cycle of the controller 20. The presenter 13 refers to the data indicating the list of features stored in the storage 19 and generates the screen illustrated in FIG. 2. The user operates the operation device 11 and selects the specific features from the screen illustrated in FIG. 2 to indicate the features for the controller 20. The presenter 13 is an example of presenting means in an aspect of the present disclosure.

The receiver 14 receives the feature selection performed on the screen illustrated in FIG. 2 by the user operating the operation device 11 as an indication of the features for the controller 20. The receiver 14 is an example of feature receiving means in an aspect of the present disclosure.

The cycle determiner 15 determines the communication cycle of the controller 20 based on the indication of the features for the controller 20 received by the receiver 14. The cycle determiner 15 includes an execution time calculator 151, an overhead calculator 152, and a cycle calculator 153. The cycle determiner 15 is an example of cycle determination means in an aspect of the present disclosure.

The execution time calculator 151 calculates a time for the controller 20 to perform the features selected by the user and received by the receiver 14. The execution time calculator 151 refers to the execution time table illustrated in FIG. 4 stored in the storage 19 described later, and calculates the time for performing the features.

The execution time table in FIG. 4 includes, in addition to the Feature column as in FIG. 2, the column of Execution time, the column of Proportional to number of connected devices?, and the column of Measurement target? The Execution time column indicates an execution time for each selected item. The Proportional to number of connected devices? column indicates whether the execution time increases in proportion to the number of control target devices 30 connected to the controller 20. The Measurement target? column indicates whether each item is a target of measurement by the measurer 17 described later.

The overhead calculator 152 calculates overhead caused by a factor other than the controller 20. The overhead caused by a factor other than the controller 20 is, for example, a total delay time including a delay time based on the number of control target devices 30 connected to the controller 20 and a delay time when a communication frame passes through the control target devices 30.

The cycle calculator 153 calculates, as the communication cycle to be set for the controller 20, a total time of the time for the controller 20 to perform the selected features calculated by the execution time calculator 151 and the overhead calculated by the overhead calculator 152.

The cycle determiner 15 determines the communication cycle calculated by the cycle calculator 153 as the communication cycle to be set for the controller 20.

The setter 16 transmits the data indicating the communication cycle determined by the cycle determiner 15 to the controller 20 through the communicator 18 to set the communication cycle for the controller 20. The setter 16 is an example of setting means in an aspect of the present disclosure.

The measurer 17 transmits a command to the controller 20 to cause the controller 20 to perform features associated with Measurement target? among the features listed in FIG. 4, and measures the execution times taken for performing the features. The measurer 17 updates the execution time table stored in the storage 19 with the measured execution times. The measurer 17 measures the execution times when the control system 1 does not operate normally in the communication cycle set for the controller 20 as described later.

Figure 5:
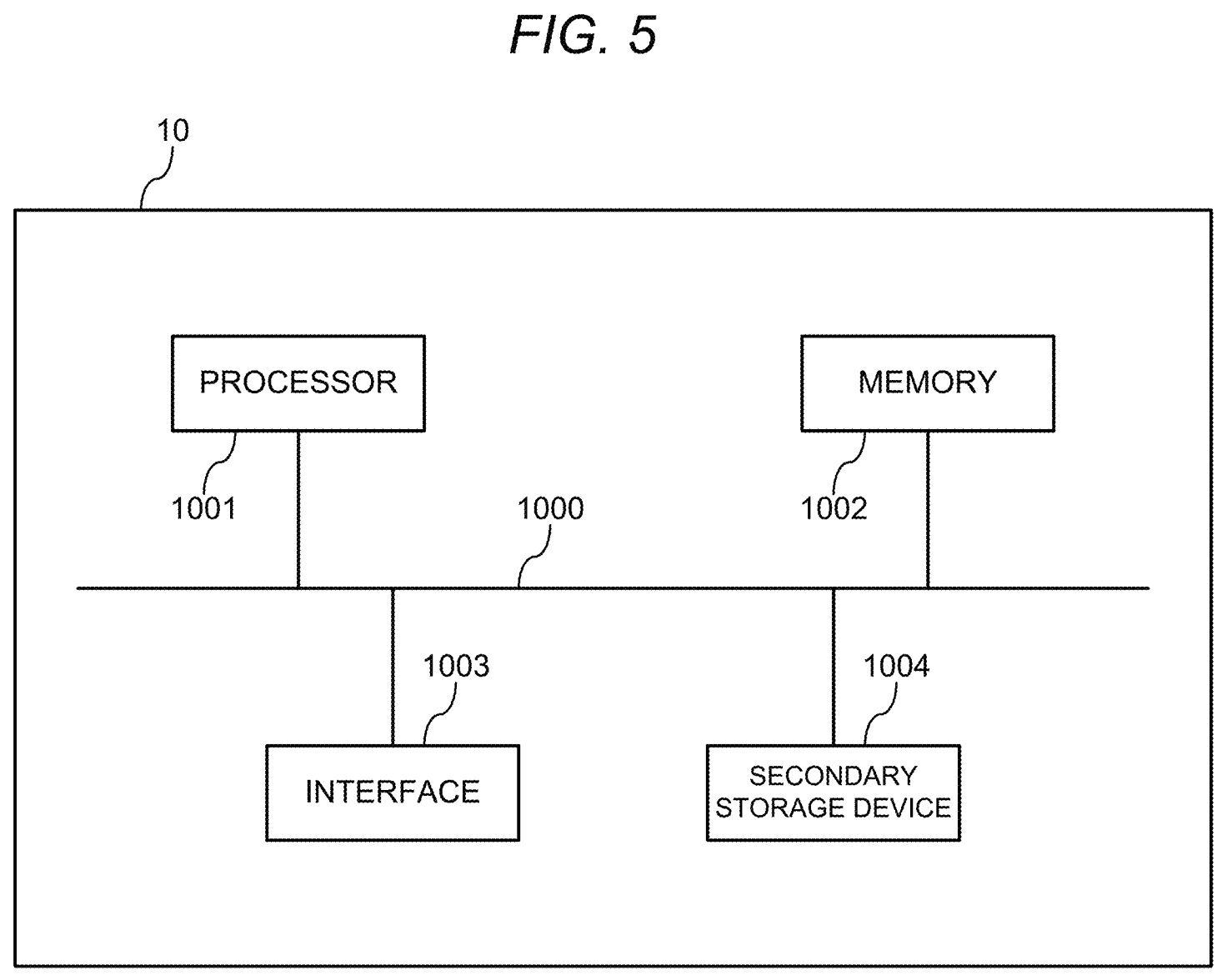

An example hardware configuration of the setting assistance device 10 is described with reference to FIG. 5. The setting assistance device 10 illustrated in FIG. 5 is implemented by a computer such as a PC, an FA PC, a smartphone, or a tablet terminal as described above.

The setting assistance device 10 includes a processor 1001, a memory 1002, an interface 1003, and a secondary storage device 1004 that are connected to one another with a bus 1000.

The processor 1001 is, for example, a central processing unit (CPU). The functions of the setting assistance device 10 are implemented by the processor 1001 that loads an engineering tool program stored in the secondary storage device 1004 into the memory 1002 and executes the engineering tool program.

The memory 1002 is, for example, a main storage device including a random-access memory (RAM). The memory 1002 stores the engineering tool program loaded by the processor 1001 from the secondary storage device 1004. The memory 1002 functions as a working memory when the processor 1001 executes the program.

The interface 1003 is an input-output (I/O) interface, such as a serial port, a universal serial bus (USB) port, or a network interface. The input device and the display device are connected to the interface to implement the functions of the operation device 11 and the display 12. The interface 1003 implements the functions of the communicator 18.

The secondary storage device 1004 is, for example, a flash memory, a hard disk drive (HDD), or a solid-state drive (SSD). The secondary storage device 1004 stores the engineering tool program to be executed by the processor 1001. The secondary storage device 1004 implements the functions of the storage 19.

An example of communication cycle determination performed by the setting assistance device 10 is described with reference to FIG. 6.

The presenter 13 in the setting assistance device 10 presents a screen for feature selection as illustrated in FIG. 2 to the user (steps S101).

The receiver 14 in the setting assistance device 10 waits for feature selection performed by the user (step S102). When the receiver 14 receives the feature selection performed by the user, the operation continues from step S103.

The execution time calculator 151 in the cycle determiner 15 included in the setting assistance device 10 refers to the execution time table stored in the storage 19 and calculates the execution time for the controller 20 to perform the features selected by the user (step S103).

The overhead calculator 152 in the cycle determiner 15 calculates the overhead caused by a factor other than the controller 20 (step S104).

The cycle calculator 153 in the cycle determiner 15 calculates a total of the execution time calculated in step S103 and the overhead calculated in step S104 as the communication cycle to be set. The cycle determiner 15 determines the calculated communication cycle as the communication cycle to be set (step S105).

The setter 16 in the setting assistance device 10 sets the communication cycle determined in step S105 for the controller 20 (step S106).

The setting assistance device 10 determines whether the control system 1 is operating normally in communication cycles set in step S106 (step S107). This determination may be performed by, for example, the setter 16 or the measurer 17.

When the control system 1 is operating normally (Yes in step S107), the setting assistance device 10 ends the communication cycle determination.

When the control system 1 is not operating normally (No in step S107), the measurer 17 in the setting assistance device 10 causes the controller 20 to perform the features and measures the execution time taken for the controller 20 to perform each feature (step S108).

The measurer 17 updates the execution time table stored in the storage 19 with the execution times measured in step S108 (step S109). The setting assistance device 10 then repeats the operation from step S103 to set the communication cycle again.

The control system 1 according to Embodiment 1 is described above. The setting assistance device 10 in the control system 1 allows the user to select features for the controller 20, calculates the execution time for the controller 20 based on the selected features, and determines the communication cycle. The setting assistance device 10 thus can determine the communication cycle of the controller 20 as appropriate for the internal processing of the controller 20. Additionally, the setting assistance device 10 allows the user to select specific features on the screen illustrated in FIG. 2 to automatically determine the communication cycle, reducing the workload of the user for setting the communication cycle.

Modification of Embodiment 1

When the presenter 13 presents the screen illustrated in FIG. 2 to the user in Embodiment 1, the presenter 13 may present, in addition to the list of features, the degree to which each feature affects the communication cycle. For example, the presenter 13 may refer to the execution time table stored in the storage 19 and additionally present the execution time for each feature to the user. In some embodiments, the presenter 13 may qualitatively display the number of command steps for performing each feature to additionally present the degree to which each feature affects the communication cycle.

Embodiment 2

A control system 1 according to Embodiment 2 is described. The control system 1 according to Embodiment 2 has the same overall configuration as the control system 1 according to Embodiment 1 illustrated in FIG. 1.

In Embodiment 2, the setting assistance device 10 presents a screen illustrated in FIG. 7 to the user, and the user indicates a control program to be executed by the controller 20 as an analysis target. This allows the setting assistance device 10 to analyze the control program to identify specific features for the controller 20 and determine the communication cycle based on the identified features.

The screen illustrated in FIG. 7 displays a file name and a file format of each control program that may be analyzed, and a selected control program. The user selects a radio button in the Selection column to select a single program from listed control programs.

Figure 8:
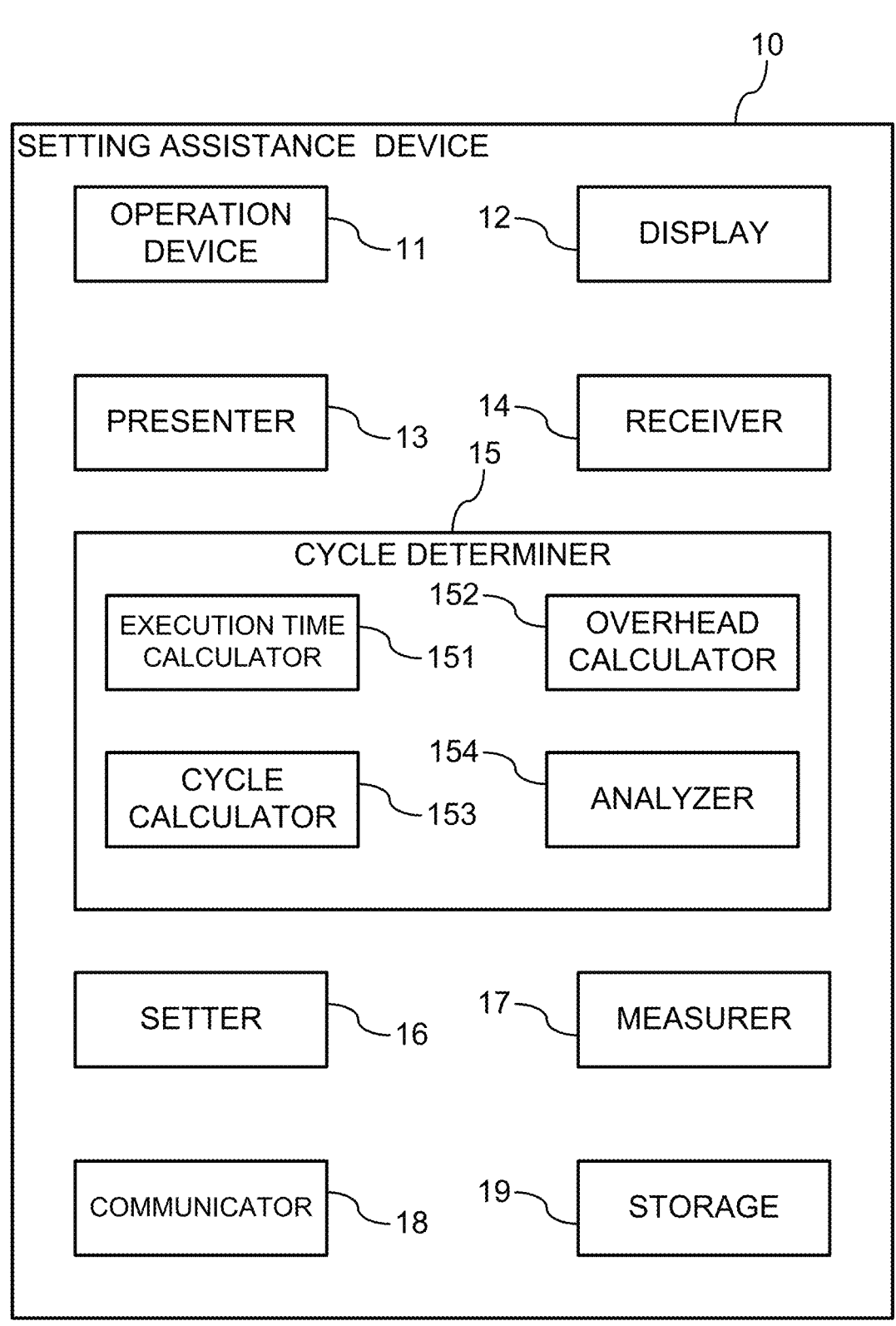
FIG. 8 is a functional block diagram of the setting assistance device according to Embodiment 2 of the present disclosure.

The setting assistance device 10 according to Embodiment 2 differs from the structure in Embodiment 1 in that the cycle determiner 15 further includes an analyzer 154 as illustrated in FIG. 8. The presenter 13, the receiver 14, the execution time calculator 151, and the storage 19 also partially differ from the structure in Embodiment 1 as described later.

The presenter 13 presents the screen illustrated in FIG. 7 in place of the screen illustrated in FIG. 2 to the user, unlike Embodiment 1. The presenter 13 presents the screen illustrated in FIG. 7 to the user to allow the user to indicate the control program to be indicated may be a source file of the control program to be executed by the controller 20 or a binary file of the control program to be executed by the controller 20.

The receiver 14 receives the indication of the control program by the user as the indication of the features for the controller 20, unlike Embodiment 1.

The storage 19 further stores a function correspondence table as illustrated in FIG. 9, unlike Embodiment 1. The function correspondence table links a function called in the control program and one or more specific features for the controller 20 for the function.

The analyzer 154 analyzes the control program received by the receiver 14 and identifies the function called in control program. The analyzer 154 refers to the function correspondence table stored in the storage 19 and identifies the specific feature(s) for the controller 20 to execute the control program. The analyzer 154 is an example of analysis means in an aspect of the present disclosure.

The analyzer 154 analyzes the source file of the control program described in a format readable by the user, such as C language, a ladder diagram, or a function block diagram, and identifies the function called in the control program. In some embodiments, the analyzer 154 may decompile and analyze the control program in an executable binary format to identify the function called in the control program.

The execution time calculator 151 calculates the execution time based on the feature(s) for the controller 20 identified by the analyzer 154, unlike in Embodiment 1.

Figure 10:
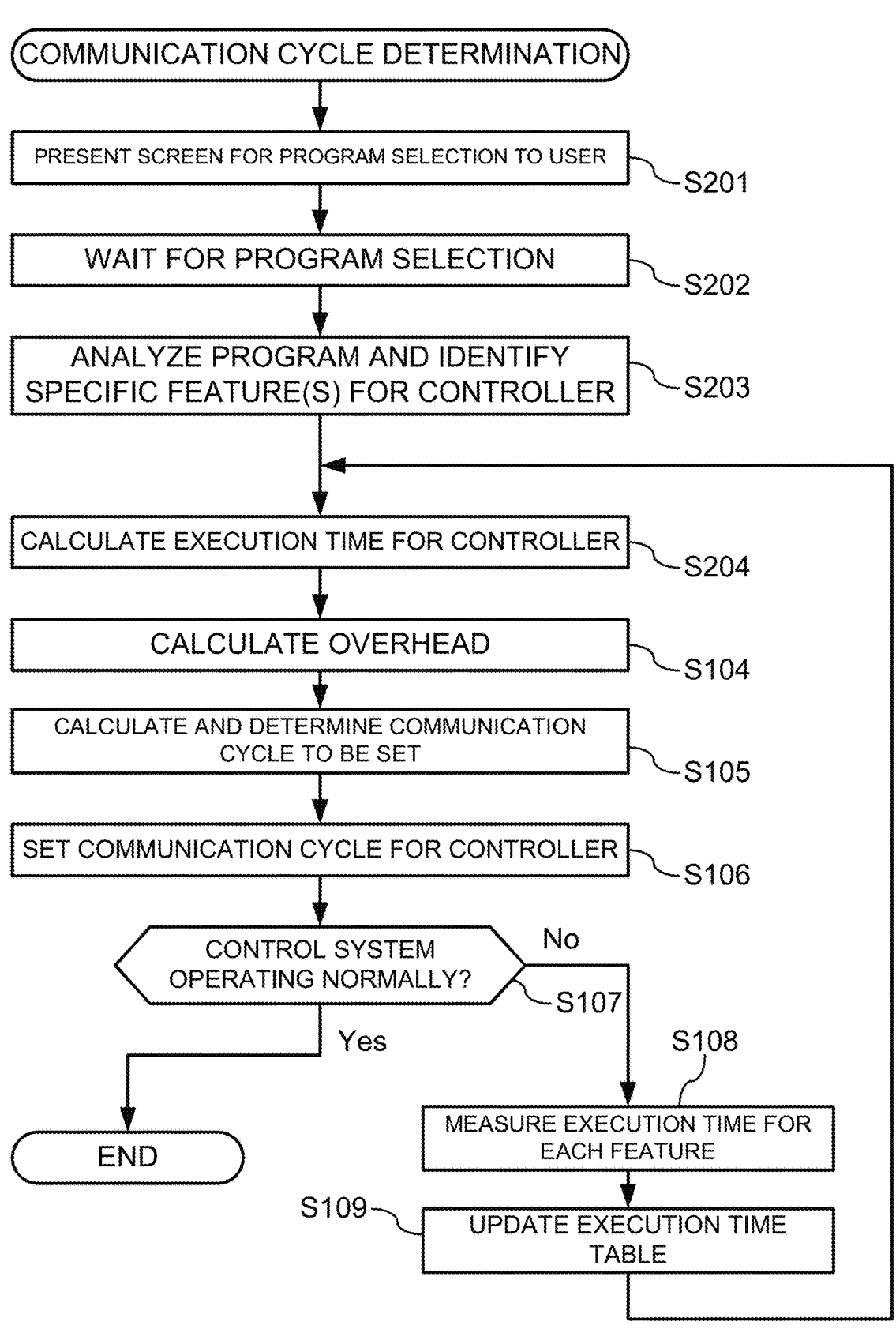
FIG. 10 is a flowchart of example communication cycle determination performed by the setting assistance device according to Embodiment 2 of the present disclosure.

Communication cycle determination performed by the setting assistance device 10 according to Embodiment 2 is described with reference to FIG. 10, focusing on the differences from the operation in Embodiment 1 illustrated in FIG. 6.

The presenter 13 in the setting assistance device 10 presents a screen for program selection illustrated in FIG. 7 to the user (step S201).

The receiver 14 in the setting assistance device 10 waits for program selection performed by the user (step S202). When the user selects a program, the setting assistance device 10 performs the operation from step S203.

The analyzer 154 in the cycle determiner 15 included in the setting assistance device 10 analyzes the program selected by the user and identifies the specific feature(s) for the controller 20 to execute the program (step S203).

The execution time calculator 151 in the cycle determiner 15 refers to the execution time table stored in the storage 19 and calculates the execution time for the controller 20 to perform the feature(s) identified in step S203 (step S204).

The subsequent operation is substantially the same as in Embodiment 1. The operation in step S109 is followed by step S204 and subsequent steps, unlike in Embodiment 1.

The control system according to Embodiment 2 is described above. The setting assistance device 10 according to Embodiment 2 analyzes the control program indicated by the user to identify the specific feature(s) for the controller 20, and determines the communication cycle based on the identified feature(s). The setting assistance device 10 according to Embodiment 2 can thus determine the communication cycle of the controller 20 as appropriate for the internal processing of the controller 20, as in Embodiment 1. Additionally, the setting assistance device 10 according to Embodiment 2 allows the user to indicate the program rather than selecting each feature, thus further reducing the workload of the user than in Embodiment 1.

Embodiment 3

A control system 1 according to Embodiment 3 is described. The control system 1 according to Embodiment 3 has the same overall configuration as the control system 1 according to Embodiment 1 illustrated in FIG. 1.

In Embodiment 3, the setting assistance device 10 presents a screen illustrated in FIG. 11 to the user to allow the user to input a specific communication cycle, in addition to selecting a feature. The screen illustrated in FIG. 11 includes an entry field to allow the user to input the specific communication cycle, unlike the screen in FIG. 2 in Embodiment 1. The specific communication cycle is a communication cycle specified by the user for the controller 20. The controller 20 then operates in communication cycles each shorter than or equal to the specific communication cycle.

As described below, in addition to performing the same functions as in Embodiment 1, the setting assistance device 10 automatically selects and presents a selectable feature to the user as illustrated in FIG. 12 when the specific communication cycle input from the user can have an extra length. The setting assistance device 10 also presents the specific communication cycle as not being satisfied with currently selected features to the user. In FIG. 12, Control E in the control process 2 is selected automatically. The user may select the feature selected automatically, or may select features again based on the result of the automatic selection.

Figure 13:
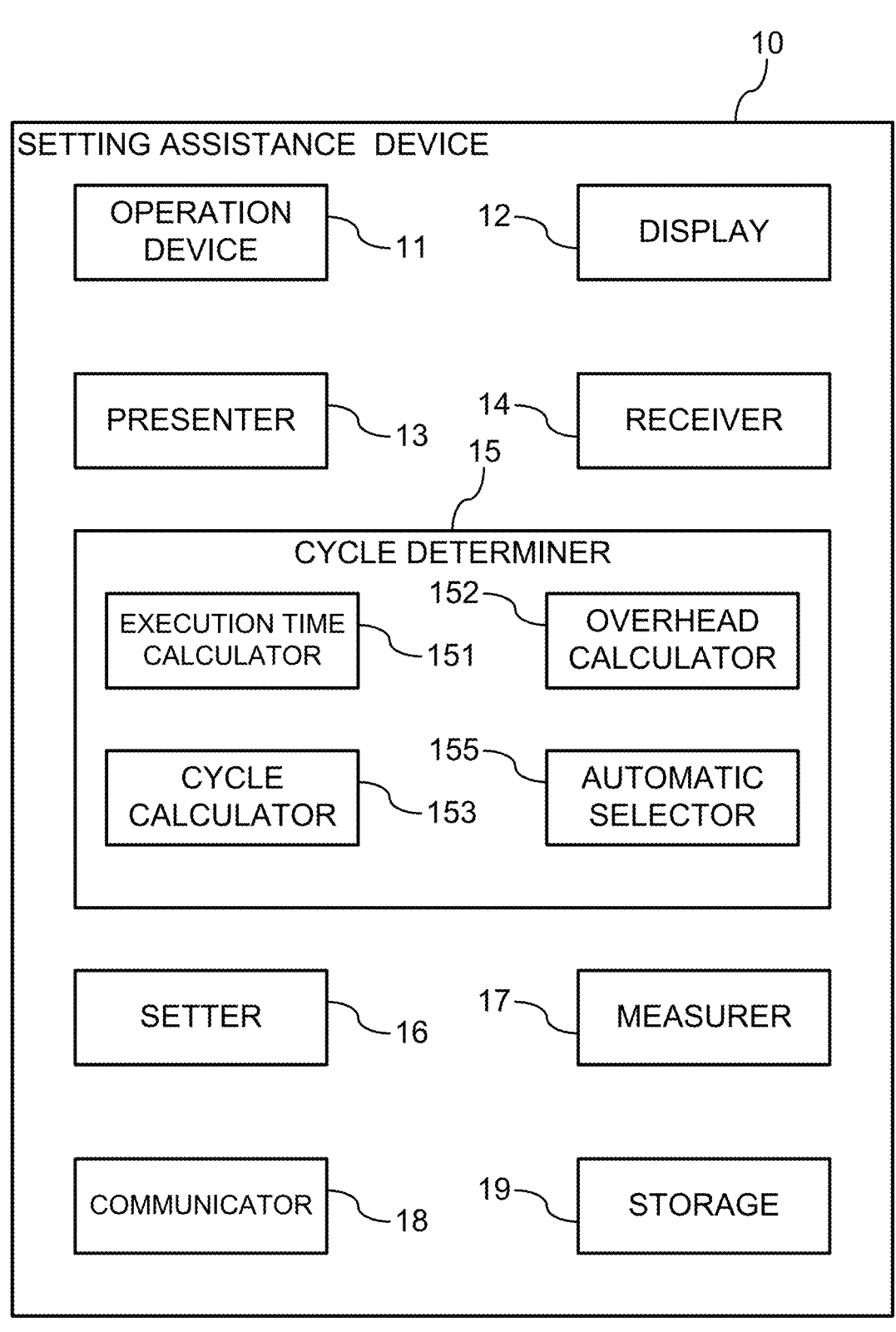
FIG. 13 is a functional block diagram of the setting assistance device according to Embodiment 1 of the present disclosure.

The functional components of the setting assistance device 10 according to Embodiment 3 are described with reference to FIG. 13 focusing on the differences from the functional components in Embodiment 1.

The cycle determiner 15 further includes an automatic selector 155, unlike in Embodiment 1. The automatic selector 155 is described later.

The presenter 13 presents the screen illustrated in FIG. 11 in place of the screen illustrated in FIG. 2 to the user, unlike in Embodiment 1. The presenter 13 also presents a screen illustrated in FIG. 12 to the user based on a result yielded by the automatic selector 155 as described later, unlike in Embodiment 1. The presenter 13 also presents the specific communication cycle as not being satisfied with currently selected features to the user when the communication cycle calculated by the cycle calculator 153 (described later) exceeds the specific communication cycle, unlike in Embodiment 1.

The receiver 14 receives the specific communication cycle in addition to the feature selection, unlike in Embodiment 1. The receiver 14 also receives an input on the screen presented by the presenter 13 illustrated in FIG. 12, or in other words, on the screen after the automatic selection, unlike in Embodiment 1. The receiver 14 in Embodiment 3 is an example of cycle receiving means in an aspect of the present disclosure.

As illustrated in FIG. 14, the execution time table stored in the storage 19 additionally includes the column of Priority, unlike in Embodiment 1. A greater value in the Priority column indicates a higher priority. The Priority is used in the automatic selection performed by the automatic selector 155 described later.

The automatic selector 155 first calculates a difference between the specific communication cycle received by the receiver 14 and the communication cycle calculated by the cycle calculator 153. The difference indicates whether the communication cycle based on the features currently selected by the user can have an extra length in comparison with the specific communication cycle.

The automatic selector 155 then refers to the execution time table stored in the storage 19 and selects, based on the calculated difference described above, features in order of priority without causing the communication cycle to exceed the specific communication cycle. The automatic selector 155 is an example of automatic selection means in an aspect of the present disclosure.

Figure 15:
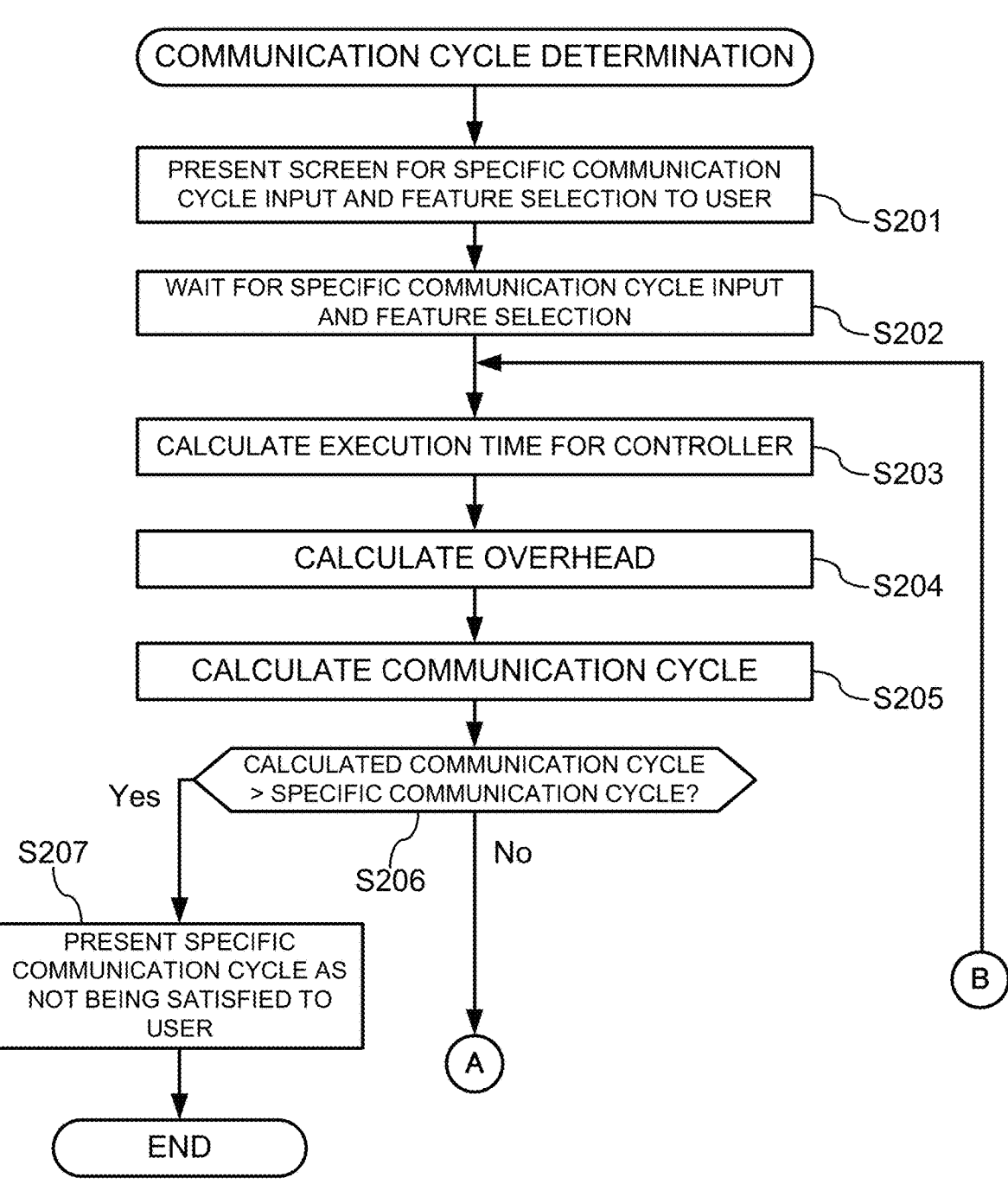
FIG. 15 is a flowchart of example communication cycle determination performed by the setting assistance device according to Embodiment 1 of the present disclosure.

An example of communication cycle determination performed by the setting assistance device 10 according to Embodiment 3 is described with reference to FIGS. 15 and 16. Flowcharts illustrated in FIGS. 15 and 16 describe a single process, with A and B in the figures connecting the flowcharts illustrated in FIGS. 15 and 16 to each other. Two Bs illustrated in FIG. 16 are both connected to a single B illustrated in FIG. 15.

Figure 6:
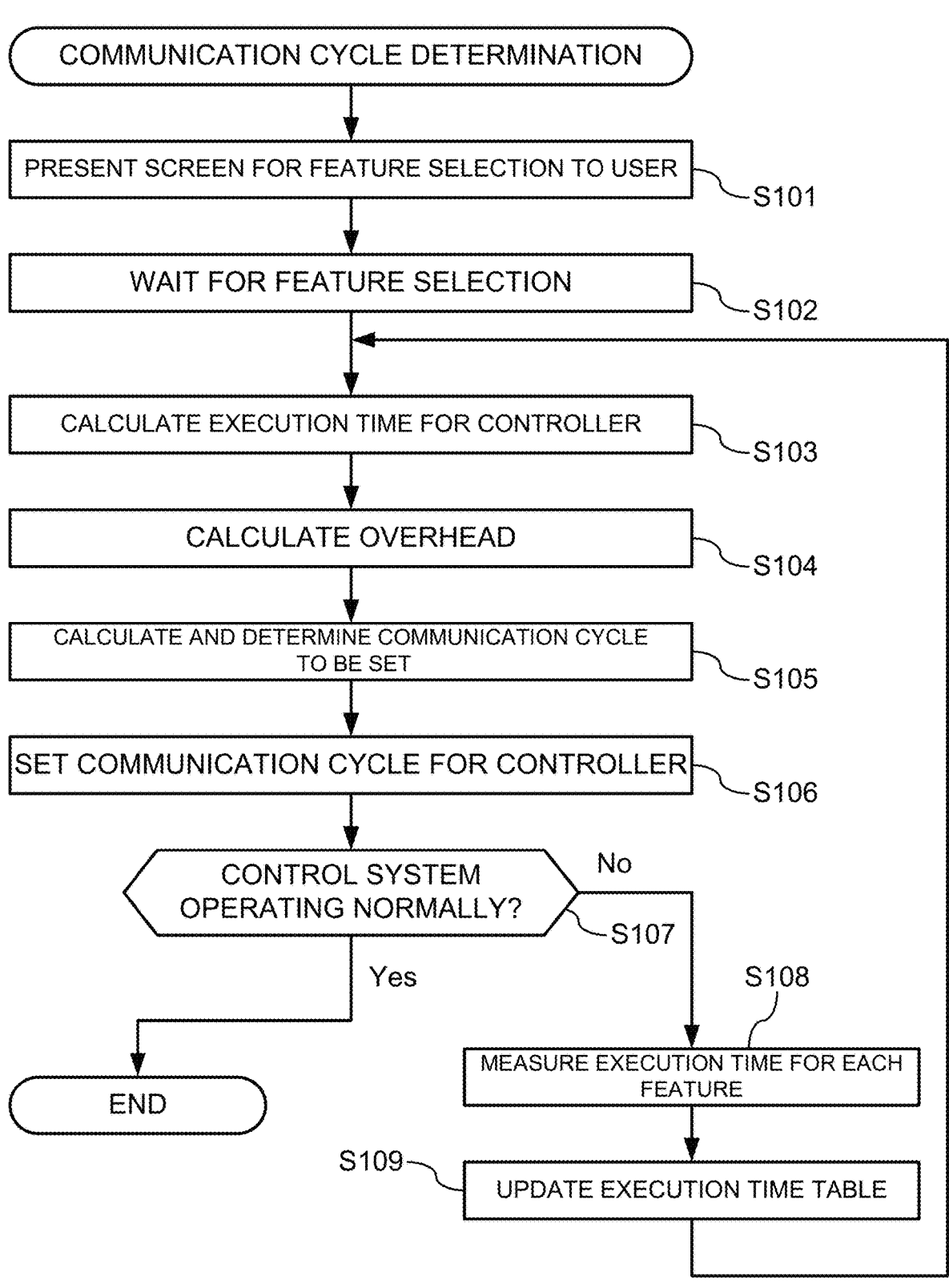
FIG. 6 is a flowchart of example communication cycle determination performed by the setting assistance device according to Embodiment 1 of the present disclosure.
Figure 16:
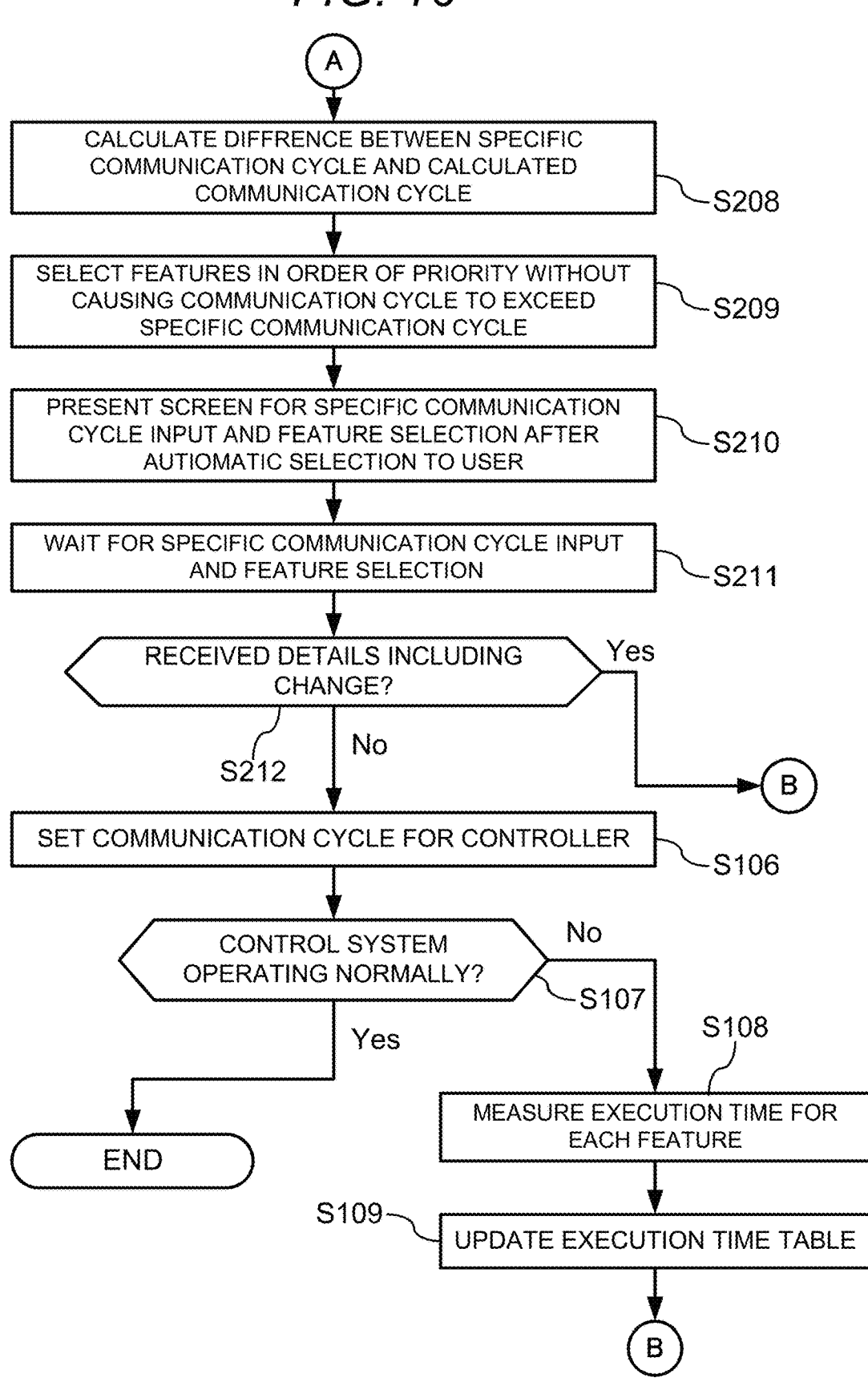
FIG. 16 is a flowchart of example communication cycle determination performed by the setting assistance device according to Embodiment 1 of the present disclosure.

The operation from step S106 to step S109 illustrated in FIG. 16 is the same as in Embodiment 1 illustrated in FIG. 6 as the reference signs indicate, and is thus not described.

The presenter 13 in the setting assistance device 10 presents a screen for specific communication cycle input and feature selection as illustrated in FIG. 11 to the user (step S201).

The receiver 14 in the setting assistance device 10 waits for the specific communication cycle input and the feature selection by the user (step S202). When the receiver 14 receives the specific communication cycle input and the feature selection by the user, the operation continues from step S203.

The execution time calculator 151 in the cycle determiner 15 included in the setting assistance device 10 refers to the execution time table stored in the storage 19 and calculates the execution time for the controller 20 to execute the features selected by the user, as in Embodiment 1 (step S203).

The overhead calculator 152 in the cycle determiner 15 calculates the overhead caused by a factor other than the controller 20, as in Embodiment 1 (step S204).

The cycle calculator 153 in the cycle determiner 15 calculates a total of the execution time calculated in step S203 and the overhead calculated in step S204 as the communication cycle (step S205).

The presenter 13 determines whether the calculated communication cycle exceeds the specific communication cycle (step S206).

When the calculated communication cycle exceeds the specific communication cycle (Yes in step S206), the presenter 13 presents the specific communication cycle as not being satisfied to the user (step S207). The setting assistance device 10 then completes the communication cycle determination.

When the calculated communication cycle does not exceed the specific communication cycle (No in step S206), the automatic selector 155 calculates the difference between the specific communication cycle and the calculated communication cycle (step S208).

The automatic selector 155 selects, based on the calculated difference, features in order of priority without causing the communication cycle to exceed the specific communication cycle (step S209).

The presenter 13 presents the screen for specific communication cycle input and feature selection reflecting the result of the automatic selection by the automatic selector 155 to the user (step S210).

The receiver 14 waits for the specific communication cycle input and the feature selection by the user, as in step S202 (step S211).

The presenter 13 determines whether the details received by the receiver 14 include a change from the details received in step S202 (step S212).

When the received details include a change from the received details in step S202 (Yes in step S212), the setting assistance device 10 repeats the operation from step S203.

When the received details include no change (No in step S212), the operation from step S106 is performed based on the selected details as in Embodiment 1.

The control system 1 according to Embodiment 3 is described above. The setting assistance device 10 according to Embodiment 3 allows the user to input the specific communication cycle, and automatically selects and presents features to the user when the communication cycle based on the features selected by the user can have an extra length to allow the user to select features again. The user can thus determine whether to select more appropriate features.

Modification of Embodiment 3

In Embodiment 3, the automatic selector 155 selects features based on priority. Instead, the automatic selector 155 may select features through machine learning. For example, a learning model may be generated in advance with the features including the connection configuration of the control target device 30, the execution time of the internal processing of the controller 20, the communication cycle, the features selected by the user, and the specific communication cycle input by the user. The automatic selector 1555 may automatically select features based on the learning model.

Other Modifications

In the hardware configuration illustrated in FIG. 5, the setting assistance device 10 includes the secondary storage device 1004. However, the secondary storage device 1004 may be external to the setting assistance device 10 and connected to the setting assistance device 10 with the interface 1003. In this configuration, the secondary storage device 1004 may be a removable medium such as a USB flash drive or a memory card.

In place of the hardware configuration illustrated in FIG. 5, the setting assistance device 10 may include a dedicated circuit such as an application-specific integrated circuit (ASIC) or a field-programmable gate array (FPGA). In the hardware configuration illustrated in FIG. 5, some of the functions of the setting assistance device 10 may be implemented by, for example, a dedicated circuit connected to the interface 1003.

The programs used by the setting assistance device 10 may be stored in a non-transitory computer-readable recording medium, such as a compact disc read-only memory (CD-ROM), a digital versatile disc (DVD), a USB flash drive, a memory card, or an HDD, and may then be distributed. The programs may be installed on a specific computer or a general-purpose computer, and the computer can then function as the setting assistance device 10.

The programs may be stored in a storage device in another server on the Internet and may be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Control system
10 Setting assistance device
11 Operation device
12 Display
13 Presenter
14 Receiver
15 Cycle determiner
16 Setter
17 Measurer
18 Communicator
19 Storage
20 Controller
30 Control target device
151 Execution time calculator
152 Overhead calculator
153 Cycle calculator
154 Analyzer
155 Automatic selector

1000 Bus
1001 Processor
1002 Memory
1003 Interface
1004 Secondary storage device

The invention claimed is:

1. A setting assistance device for assisting in setting a controller to communicate with a control target device in constant cycles, the setting assistance device comprising:
   a presenter to present, for a user to select from, a list of features affecting a communication cycle of the controller,
   a feature receiver to receive selection by the user with the list presented by the presenter as an indication of a feature of the controller;
   a cycle receiver to receive an indication of a specific communication cycle, the specific communication cycle being a communication cycle specified by the user;
   an automatic selector to automatically select a feature affecting the communication cycle of the controller without causing the communication cycle to exceed the specific communication cycle,
   a cycle determiner to calculate a time for the controller to perform the feature indicated by the indication of the feature received by the feature receiver and to determine a communication cycle of the controller based on the calculated time;
   a setter to set, for the controller, the communication cycle determined by the cycle determiner,
   wherein the list of features further includes an entry field to allow an input of the specific communication cycle, and
   the presenter presents, to the user, the list of features further including the feature selected automatically by the automatic selector.

2. The setting assistance device according to claim 1, wherein
   the presenter further presents a degree to which each of the features affects the communication cycle.

3. A control system, comprising:
   the setting assistance device according to claim 1; and
   the controller.

4. A setting assistance method for assisting in setting a controller to communicate with a control target device in constant cycles, the method comprising:
   presenting, for a user to select from, a list of features affecting a communication cycle of the controller,
   receiving selection by the user with the presented list as an indication of a feature of the controller;
   receiving an indication of a specific communication cycle, the specific communication cycle being a communication cycle specified by the user;
   automatically selecting a feature affecting the communication cycle of the controller without causing the communication cycle to exceed the specific communication cycle,
   calculating a time for the controller to perform the feature indicated by the received indication of the feature;
   determining a communication cycle of the controller based on the calculated time; and
   setting the determined communication cycle for the controller,
   wherein the list of features further includes an entry field to allow an input of the specific communication cycle, and the presenting includes presenting, to the user, the list of features further including the feature selected automatically by the automatically selecting.

5. A non-transitory computer-readable medium storing a program for assisting in setting a controller to communicate with a control target device in constant cycles, the program causing a computer to perform operations comprising:

presenting, for a user to select from, a list of features affecting a communication cycle of the controller, receiving selection by the user with the presented list as an indication of a feature of the controller;

receiving an indication of a specific communication cycle, the specific communication cycle being a communication cycle specified by the user;

automatically selecting a feature affecting the communication cycle of the controller without causing the communication cycle to exceed the specific communication cycle, calculating a time for the controller to perform the feature indicated by the received indication of the feature;

determining a communication cycle of the controller based on the calculated time; and setting the determined communication cycle for the controller, wherein the list of features further includes an entry field to allow an input of the specific communication cycle, and the presenting includes presenting, to the user, the list of features further including the feature selected automatically by the automatically selecting.

* * * * *